Figure 5:
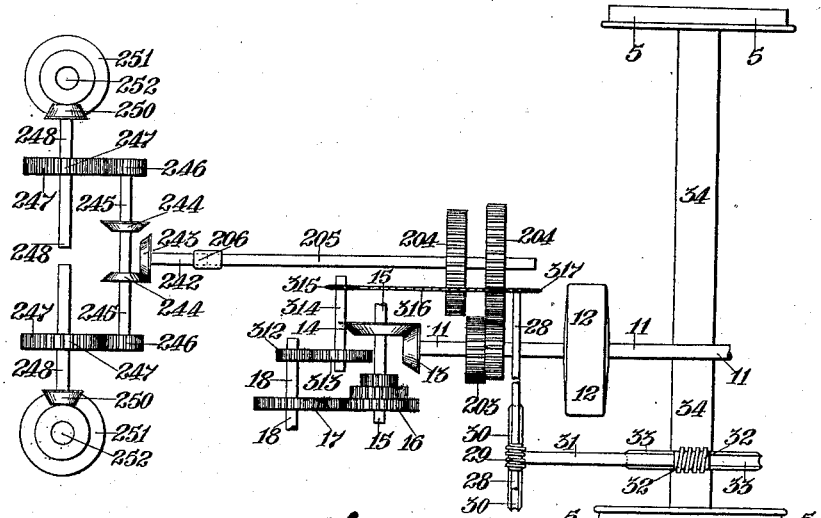

M. WOODS & T. J. GILBERT.
MACHINE FOR DRESSING RAILS.
APPLICATION FILED JAN. 17, 1910.
1,032,721.
Patented July 16, 1912.
7 SHEETS—SHEET 1.
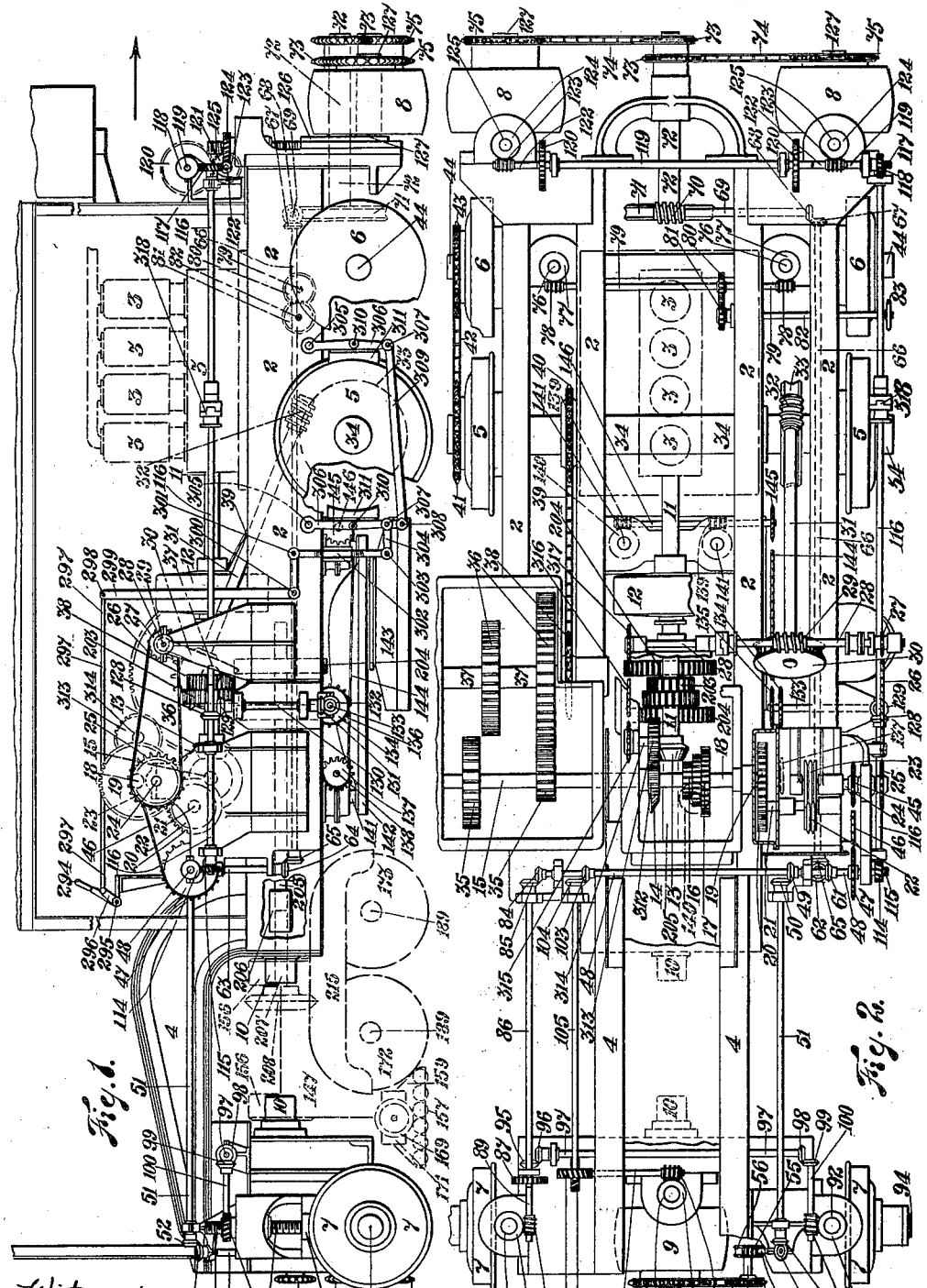

M. WOODS & T. J. GILBERT.
MACHINE FOR DRESSING RAILS.
APPLICATION FILED JAN. 17, 1910.
1,032,721.
Patented July 16, 1912.
7 SHEETS—SHEET 2.
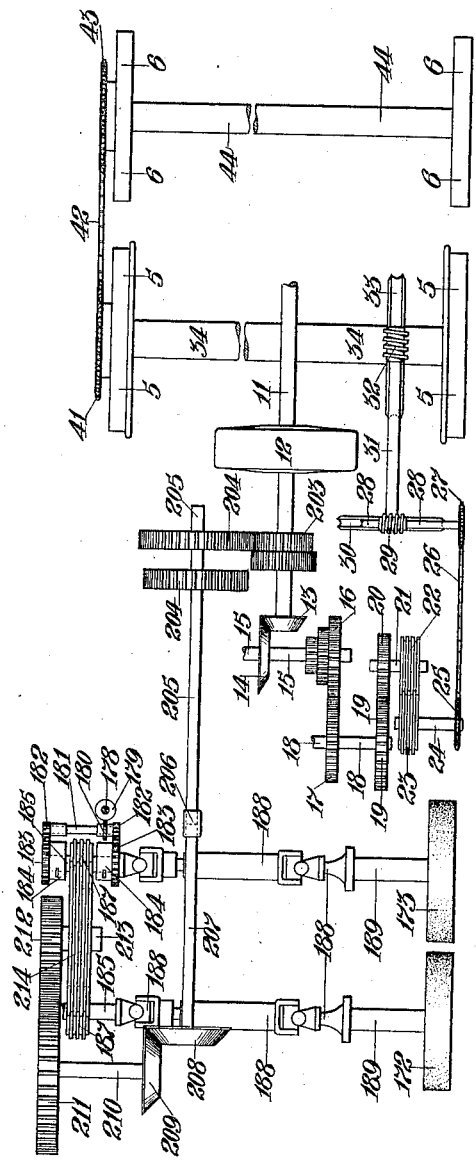
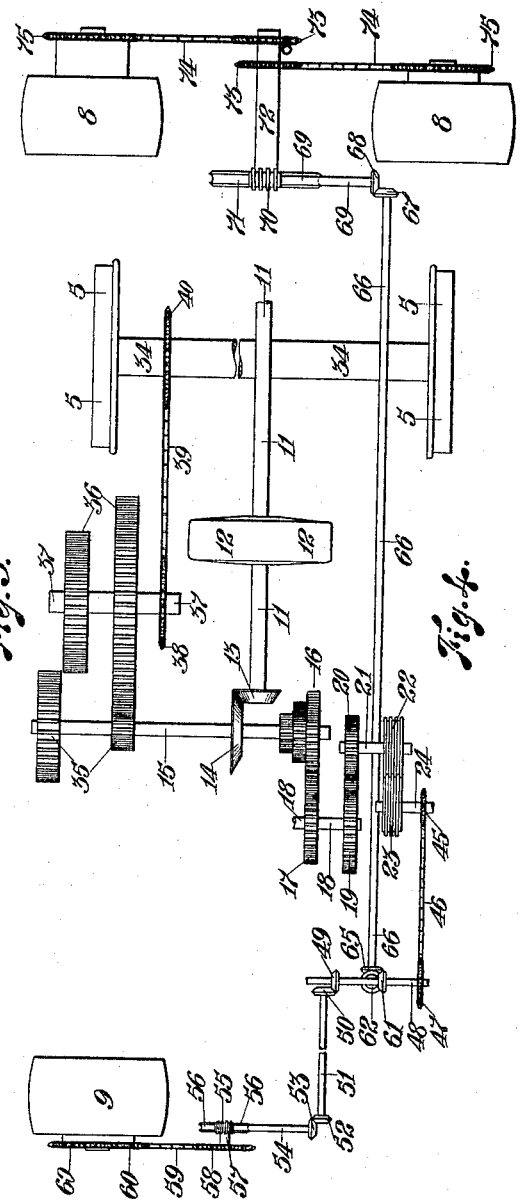

M. WOODS & T. J. GILBERT.
MACHINE FOR DRESSING RAILS.
APPLICATION FILED JAN. 17, 1910.
1,032,721.
Patented July 16, 1912.
7 SHEETS—SHEET 3.
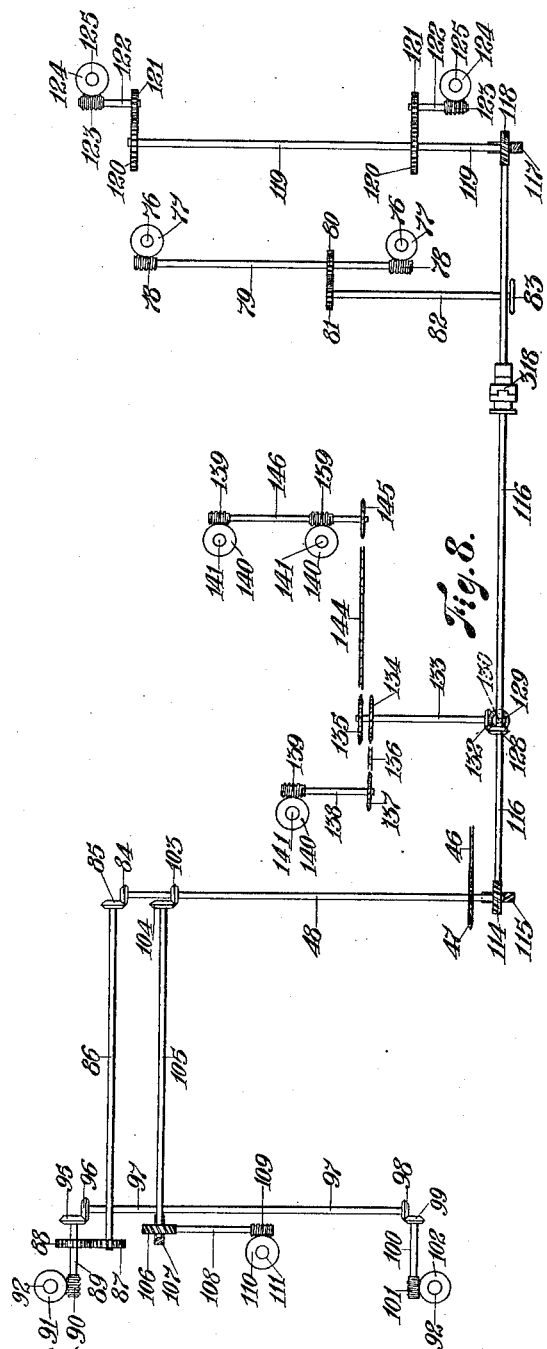
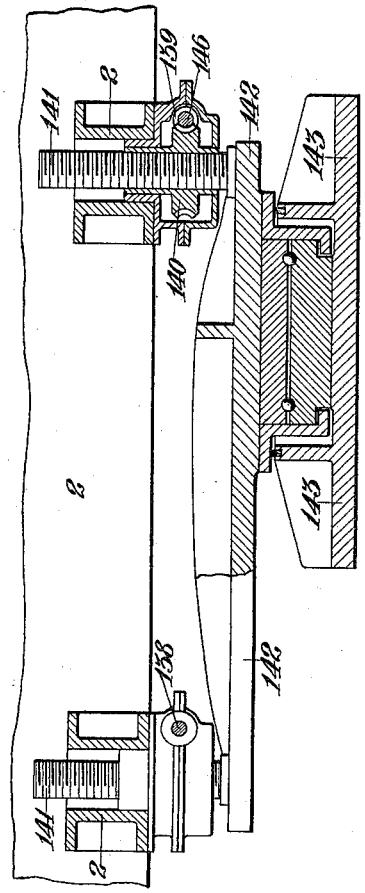
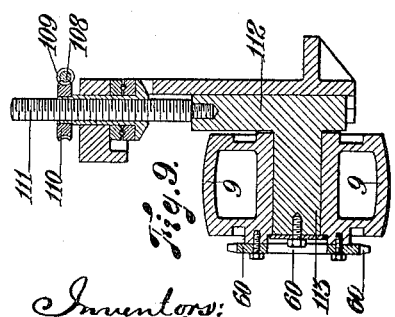
Witnesses:
James B. Mansfield
L. E. Witham
Inventors:
Michael Woods & Thomas J. Gilbert
By: Alexander Lowell
Attorneys M. WOODS & T. J. GILBERT.
MACHINE FOR DRESSING RAILS.
APPLICATION FILED JAN. 17, 1910.

1,032,721.

Patented July 16, 1912.
7 SHEETS—SHEET 4.

Witnesses
James Bransfield
L. E. Witham

Inventors:
Michael Woods
Thomas J. Gilbert
By
Alexander Bowell
Attorneys

COLUMBIA PLANOGRAPH CO., WASHINGTON, D. C.

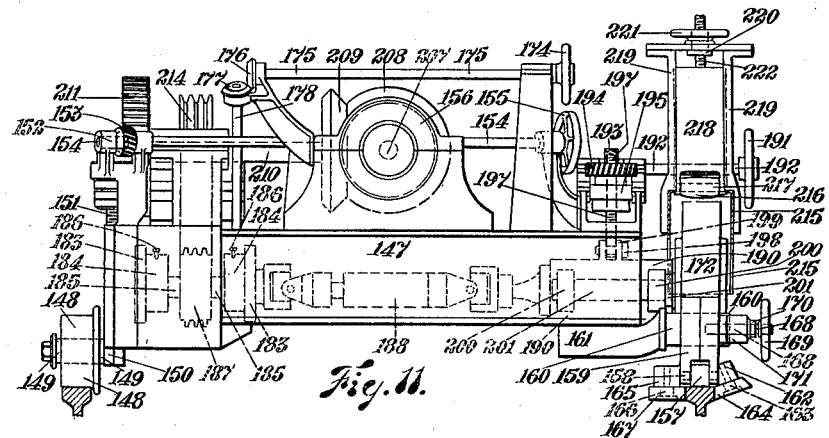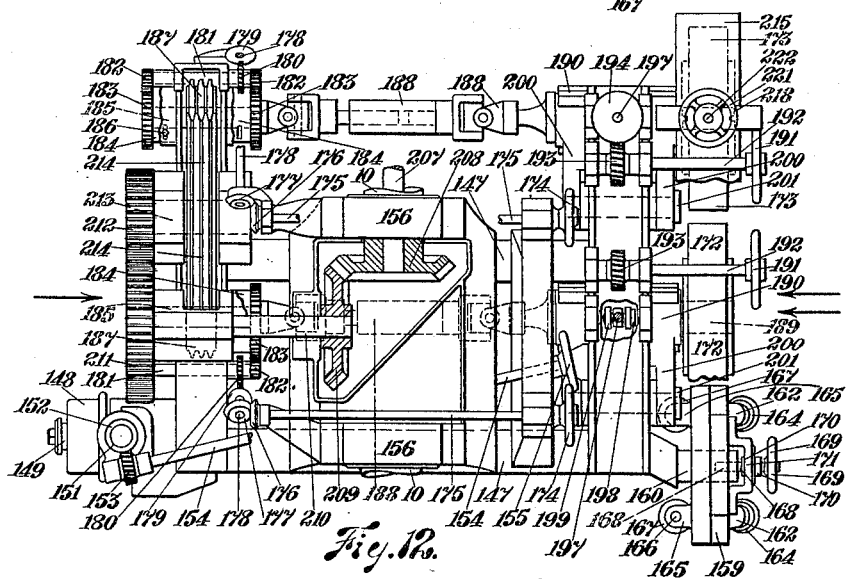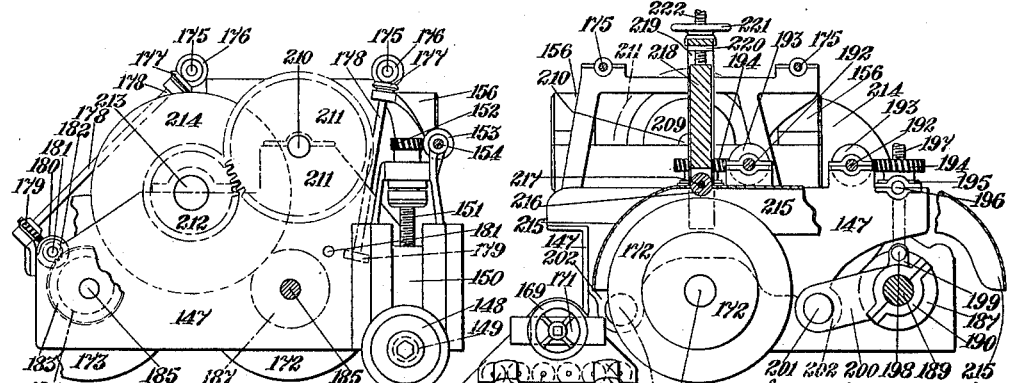

M. WOODS & T. J. GILBERT.
MACHINE FOR DRESSING RAILS.
APPLICATION FILED JAN. 17, 1910.

1,032,721.

Patented July 16, 1912.
7 SHEETS—SHEET 6.

Witnesses:
James Mansfield
L. E. Witham.

Inventors:
Michael Woods.
Thomas J. Gilbert
By:
Alexander Lowell
Attorney

M. WOODS & T. J. GILBERT.
MACHINE FOR DRESSING RAILS.
APPLICATION FILED JAN. 17, 1910.

1,032,721.

Patented July 16, 1912.

7 SHEETS—SHEET 7.

UNITED STATES PATENT OFFICE.

MICHAEL WOODS, OF CARLTON, AND THOMAS JEFFERSON GILBERT, OF BRUNSWICK, VICTORIA, AUSTRALIA.

MACHINE FOR DRESSING RAILS.

1,032,721.   Specification of Letters Patent.   Patented July 16, 1912.

Application filed January 17, 1910. Serial No. 538,519.

*To all whom it may concern:*

Be it known that we, MICHAEL WOODS, a subject of the King of Great Britain and Ireland, residing at 309 Pigdon street, Princes Hill, Carlton, a postal division and suburb of the city of Melbourne, and THOMAS JEFFERSON GILBERT, a subject of the King of Great Britain and Ireland, residing at 1 Minnie street, in the city of Brunswick, a suburb of the city of Melbourne, both in the county of Bourke, State of Victoria, Commonwealth of Australia, have invented certain new and useful Improvements in Machines for Dressing Rails, of which the following is a specification.

This invention relates to deformities in rails, either present upon installation or developed by continuous use.

Experience has shown that both railway or plain headed rails and tramway or grooved rails, especially after a lengthened period on the track, become corrugated or wavy on their surface, the joints defective, and the fish plates loose. In railway rails an additional defect occurs at curves where one rail head becomes burred and the other beveled by contact of the wheels of the rolling stock. In tramway rails the rail treads also wear away, rendering the grooves shallow and leaving the lips upstanding. In the past, rails have been treated while in position on the track by moving or traveling mechanical apparatus to remove the faults mentioned, but instead of consistently eliminating defects, such devices have often reproduced them and likewise have communicated irregularities from one part of the rail to another in a lesser degree. Differences in rail elevation have also hitherto been a serious obstruction to successful treatment.

The object of this invention is to provide a moving or traveling machine, having self-propelling and actuating mechanism and quickly adjustable grinding, milling or cutting mechanism for accurately removing, in a reliable, speedy and economical manner, any defects, while the rails are in position on the track. These mechanisms may be driven at different speeds.

According to this invention a motor-driven platform is provided, mounted upon driving wheels. To this platform is centrally and pivotally secured an attachment (hereinafter called an adapter). There are three adapters, each performing certain specific operations. Whichever is required is pivoted to the platform and is removed when its operations are completed.

For removing corrugations, and for lengthening the short depressions occurring at joints, a grinder adapter is pivoted to the platform and includes adjustable grinding wheels. These wheels are dressed as occasion requires without removal from the adapter. The grinder adapter being pivoted does not communicate differences in the elevation of one rail to its fellow, and by the use of multiple rollers upon the adapter and auxiliary wheels adjacent to the platform driving wheels, it is not influenced by corrugations and joint depressions and does not reproduce irregularities.

For reseating fish plates, that is, cutting a new and true bed in the rail to permit of the substitution of a larger plate, and for removing the burs and bevels of plain headed rails, a vertical cutter adapter is pivoted to the platform and includes a vertical milling cutter each side thereof, each cutter being adjustable both vertically and laterally and alined with the rail or kept up to its work by guide rollers. The vertical cutter adapter, being pivoted, does not communicate differences in the elevation of one rail to its fellow, and each cutter may treat either side of its rail. Suitable cutters of varying contours are used for different operations.

For deepening rail grooves and removing upstanding lips, a horizontal cutter adapter is centrally pivoted to the platform and includes a horizontal laterally adjustable cutter each side thereof. The horizontal cutter adapter, being pivoted, does not communicate differences in the elevation of one rail to its fellow, and, by the use of vertically adjustable guiding wheels, the depth of the cut can be regulated.

When grinding or cutting, the machine is propelled slowly through certain gearing, but during transportation it is propelled rapidly through different gearing. When being transported, the machine travels upon the main driving wheels and upon wheels below extensions from the platform. These extension wheels are not used during working operations, so are capable of being elevated and depressed by the motor. During working operations the machine is supported upon the driving wheels, upon wheels or rollers below the adapter, and at the pivotal connection between the adapter and the platform.

As the auxiliary wheels are only necessary during grinding operations provision is made for their elevation and depression.

To move the machine from one track to another, it is provided with traversing wheels capable of elevation and depression by the motor.

To reverse the machine a turntable is provided capable of elevation and depression by the motor.

Other objects and advantages will be in part pointed out and in part obvious hereafter.

Figure 6:
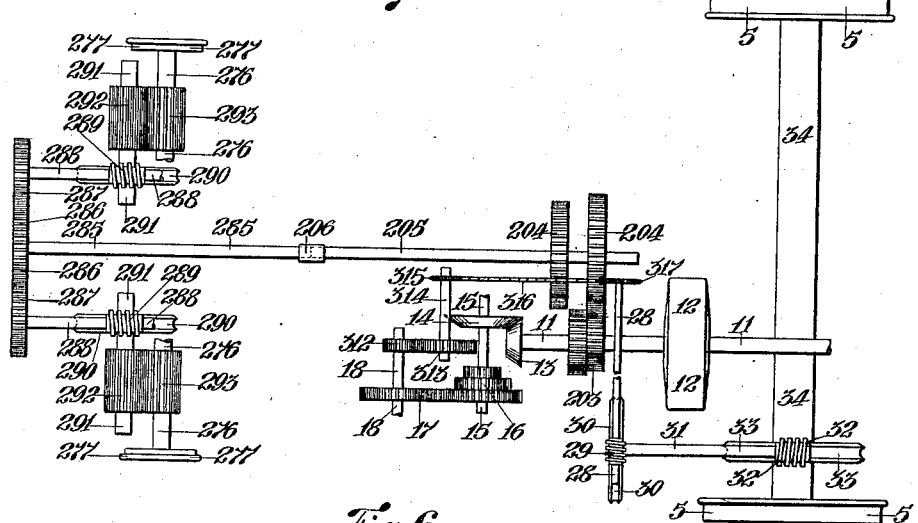
Figure 7:
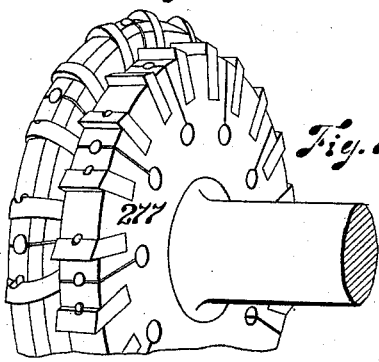
Figure 15:
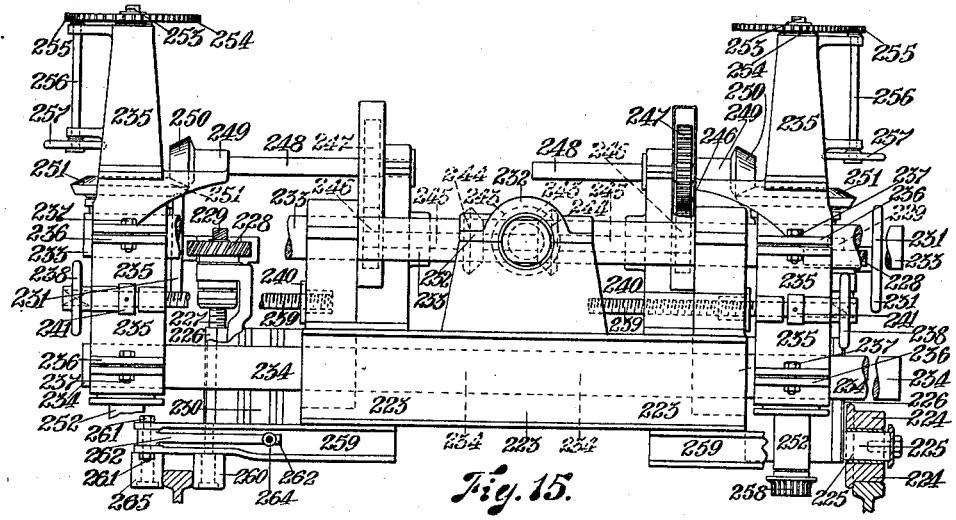
Figure 16:
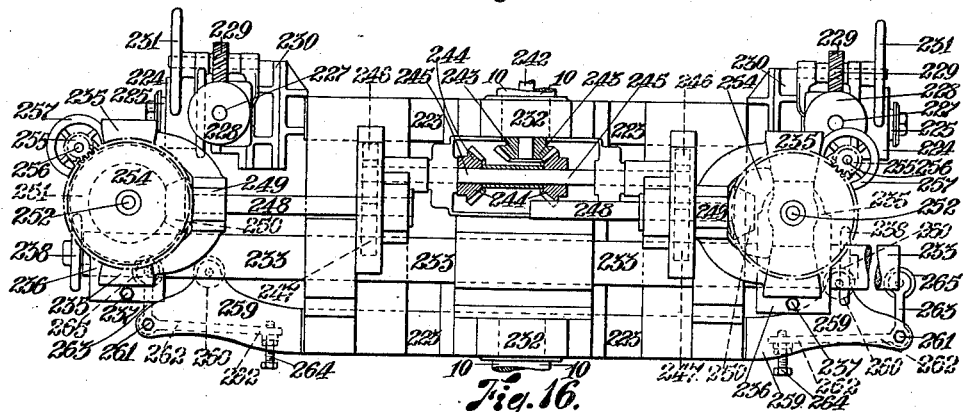
Figure 17:
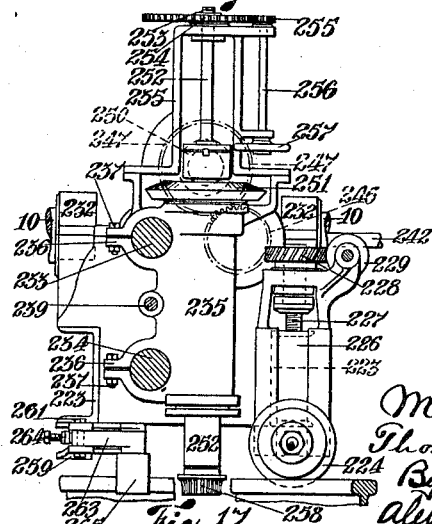
Figure 18:
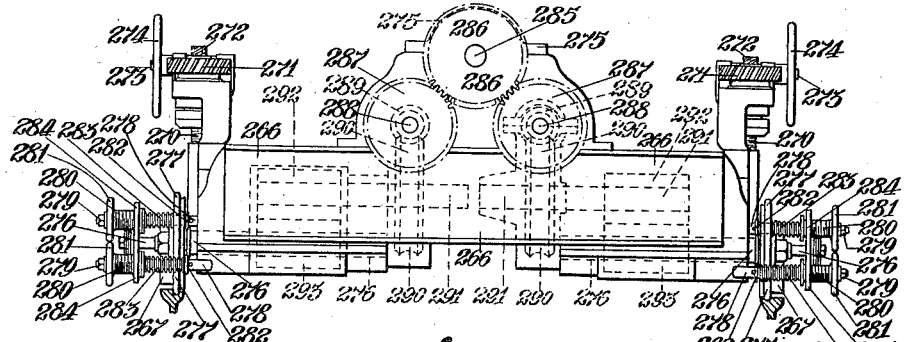
Figure 19:
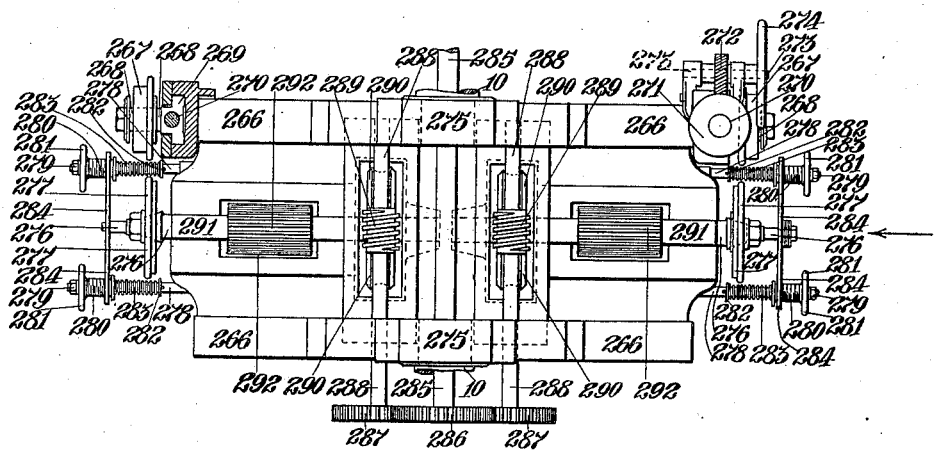
Figure 20:
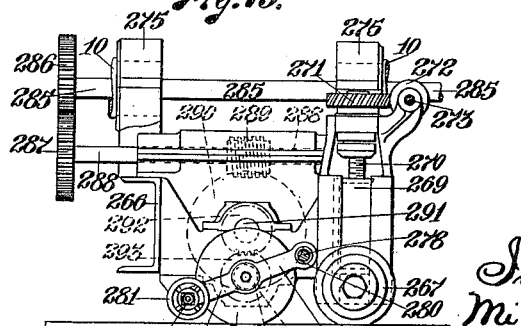

Referring to the drawings which form a part of this specification: Figure 1 is a side elevation of this invention, showing, in broken lines, outlines of an attached grinder adapter. The motor is also shown in broken lines. For clearness of illustration, parts are omitted and parts broken away. The traversing and auxiliary wheels are shown depressed. All gears are in engagement with the exception of that driving an adapter shaft. A brake gear is seen. The arrow indicates the direction of travel of the machine when dressing rails. Fig. 2 is a plan of this invention, the adapter and the brake gear being removed. For clearness parts are omitted and parts broken away. All gears are in engagement with the exception of that driving an adapter shaft. Fig. 3 is a diagrammatic view of driving gears for propelling the machine when using a grinder adapter, and of gears for rotating the grinding wheels. Where parts are normally obscured they have been transposed for clear delineation. Portion of gear for stopping and starting the grinding wheels has been shown as regards one wheel, but not as regards the other. Fig. 4 is a diagrammatic view of traveling and traversing gears for transporting the machine or for moving it transversely from track. Parts of the gear have been transposed for clear delineation. Fig. 5 is a diagrammatic view of driving gears for propelling the machine when using a vertical cutter adapter, and of gears for rotating the cutters. Parts have been transposed for clear delineation. Fig. 6 is a diagrammatic view of driving gears for propelling the machine when using a horizontal cutter adapter and of gears for rotating the cutters. Parts have been transposed for clear delineation. Fig. 7 is a perspective view of a horizontal cutter, portion of which has been broken away for convenience. Fig. 8 is a diagrammatic view of elevating and depressing gear for operating upon auxiliary wheels, extension wheels, traversing wheels, and for elevating or depressing a turntable. Parts have been transposed for clear delineation. Fig. 9 is a sectional view of a traversing wheel below the platform extensions. This view shows features common to all elevatable and depressible wheels of the machine. Fig. 10 is a partly sectional side elevation of the turntable. Fig. 11 is an elevation of a grinder adapter. For clearness parts have been sectioned, omitted or broken away. The adapter is ready to treat plain headed rails, a multiple roller attachment being in position. When used upon grooved rails side rollers of this attachment are removed. The adapter driving shaft is shown to indicate its relative position. Fig. 12 is a plan of Fig. 11. For clearness parts have been sectioned, omitted or broken away. In this connection, portion of a grinding wheel guard has been removed, and consequently only one grinding wheel dresser is shown. Portion of one grinding wheel has been broken away and part of the worm gear for raising and lowering the said wheel removed. Parts of trunnions are shown to illustrate their relative position, the adapter driving shaft being in position. Fig. 13 is an end elevation of Fig. 12 looking in the direction of single arrow. For clearness, parts have been sectioned, omitted, or broken away. An outer eccentric cylindrical bearing, its toothed ring and the pinion turning it, at the right hand side, have been removed to permit of the illustration of a friction pinion. Fig. 14 is an end elevation of Fig. 12 looking in the direction of the pair of arrows. For clearness, parts have been sectioned, omitted, or broken away. In this connection, one grinding wheel and its dresser are removed, and a friction pinion at the opposite side of the adapter is seen by the omission of an eccentric cylindrical bearing. Fig. 15 is an elevation of a vertical cutter adapter used upon plain headed rails. For clearness, parts have been sectioned, omitted, or broken away. The right hand cutter is shown at its innermost travel, while the left hand cutter is at its outermost travel. The rollers of a right hand alining and steadying attachment are removed, as is also the left cutter and supporting wheel. The adapter driving shaft is shown in its correct relative position. Fig. 16 is a plan of Fig. 15. For clearness, parts have been sectioned, omitted, or broken away. Both the right and left hand supporting wheels and alining rollers are in place. Portions of trunnions are shown to indicate their relative positions, the adapter driving shaft being in position. Fig. 17 is an end elevation of Fig. 15. For clearness, parts have been sectioned, omitted or broken away. Fig. 18 is an elevation of a horizontal cutter adapter used upon grooved rails. For clearness, parts have been sectioned, omitted, or broken away. The adapter driving shaft is shown. Fig. 19 is a plan of Fig. 18. For clearness, parts have been sectioned, omitted, or broken away. At the left side of the adapter, a guiding wheel vertically adjusting gear has been removed to illustrate a slide. Portions of trunnions have been shown to indicate their relative positions, and the adapter driving shaft is in position within them. Fig. 20 is an end elevation of Fig. 18. For clearness, parts have been sectioned, omitted, or broken away.

On reference to the drawings (Figs. 1 and 2) it will be seen that 2 is a platform, above which is a motor 3 and at one end two cantalivers or extensions 4. Below the platform are two non-depressible flanged driving wheels 5, and two depressible unflanged auxiliary wheels 6. Below the extensions are depressible flanged extension wheels 7. These wheels are for the longitudinal movement of the machine. Below the platform are two plain traversing wheels 8, and below the extensions is a plain traversing wheel 9. These are for the lateral movement of the machine. From the extensions protrude hollow trunnions 10 to accommodate one of three adapters hereinafter described.

To propel the machine when grinding or cutting (Figs. 1, 2, 3, 4, 5 and 6), a motor shaft 11 proceeds longitudinally from the motor 3. Upon this shaft is a friction clutch 12 of any suitable character. The shaft 11 drives a bevel pinion 13 turning a bevel wheel 14 on a cross shaft 15. Upon the shaft 15 is a suitable change speed gear 16, operating a suitable change speed gear 17 on a cross shaft 18. Upon the shaft 18 is a toothed wheel 19 operating a toothed pinion 20 on a cross shaft 21. These wheels 19 and 20 are engaged or disengaged in any ordinary way. Upon the shaft 21 is a friction wheel 22 engaging a friction wheel 23 on a cross shaft 24. Upon the shaft 24 is a sprocket wheel 25 (see Fig. 3), driving by a sprocket chain 26 a sprocket wheel 27 on a cross shaft 28. The wheel 27 is engaged or disengaged with the shaft 28 in any ordinary way. On the shaft 28 is a worm 29, driving a worm wheel 30, on an inclined longitudinal shaft 31. Upon the shaft 31 is a worm 32 turning a worm wheel 33 on the main driving axle 34, upon which are the driving wheels 5. The wheel 33 is engaged or disengaged with the axle 34 in any ordinary way. The machine is propelled when grinding by the gearing described, the auxiliary wheels 6 being upon the rails. Upon the shaft 18 is also a toothed pinion 312 (see Fig. 6) engaging a toothed wheel 313 on a cross shaft 314. Upon the shaft 314 is a sprocket wheel 315, driving by a sprocket chain 316 a sprocket wheel 317 on the shaft 28. The wheel 317 is engaged or disengaged with the shaft 28 in any ordinary manner. When the machine is cutting, the wheels 19 and 20 are disengaged, and the shaft 28 is driven through the pinion 312, wheel 313 and wheels 315 and 317, instead of through the friction wheels 22 and 23. The auxiliary wheels are then elevated and off the rails.

To propel the machine for transportation purposes (Figs. 1, 2 and 4), a suitable change speed gear 35 is provided upon the shaft 15. This gear operates a suitable change speed gear 36 on a cross shaft 37. Upon the shaft 37 is a sprocket wheel 38, driving by a sprocket chain 39 a sprocket wheel 40 upon the main driving axle 34. The auxiliary wheels 6 are elevated from the rails during transportation, and only the gearing just described is in operation.

To drive the auxiliary wheels, there is secured (Figs. 2 and 3) to the main driving axle 34 a sprocket wheel 41, communicating by a sprocket chain 42 with a sprocket wheel 43 upon the auxiliary wheel axle 44.

To drive the traversing wheel 9 there is (Figs. 1, 2 and 4) situated upon the shaft 24 a sprocket wheel 45, driving by a sprocket chain 46 a sprocket wheel 47 on a cross shaft 48. Upon the shaft 48 is a bevel wheel 49, driving a bevel wheel 50 on a longitudinal shaft 51. The wheels 49 and 50 are engaged or disengaged in any ordinary way. To the shaft 51 is attached a bevel wheel 52, turning a bevel wheel 53 upon an inclined shaft 54. A worm 55 upon the shaft 54 turns a worm wheel 56 upon a longitudinal shaft 57. Upon the shaft 57 is a sprocket wheel 58, driving by a sprocket chain 59 a sprocket wheel 60 fixed to the traversing wheel 9. When operating traversing wheels, the axle 34 is disengaged.

To drive the traversing wheels 8 (Figs. 1, 2 and 4) a bevel wheel 61 is attached to the shaft 46 and turns a bevel wheel 62 upon a vertical shaft 63. These wheels 61 and 62 are engaged or disengaged in any ordinary way. Upon the shaft 63 is a bevel wheel 64 rotating a bevel wheel 65 on a longitudinal shaft 66. Upon the shaft 66 is a bevel wheel 67 turning a bevel wheel 68 on a cross shaft 69. A worm 70, upon the shaft 69, turns a worm wheel 71 on a longitudinal shaft 72. Upon the shaft 72 are two sprocket wheels 73, each driving, by a sprocket chain 74, a sprocket wheel 75 secured to its respective traversing wheel 8. When operating the traversing wheels, other gearing, hereinafter described, driven from the shaft 48 is disengaged.

The axle 44 (Figs. 1, 2 and 8) of the auxiliary wheels 6 turns in suitable bearings, above each of which is a screw 76. To elevate or depress the auxiliary wheels, around each screw turns a worm wheel nut 77, rotated by a worm 78 on a cross shaft 79, upon which is a toothed wheel 80. This wheel engages a toothed wheel 81 on a cross shaft 82 upon the outer end of which is a hand wheel 83.

To elevate or depress the extension wheels 7 (Figs. 1, 2 and 8) there is situated upon the shaft 48 a bevel wheel 84 driving by a bevel wheel 85 a far longitudinal shaft 86. These wheels 84 and 85 are engaged or disengaged in any ordinary way. Upon the shaft 86 is a toothed wheel 87 turning a toothed wheel 88 on a longitudinal shaft 89. A worm 90 on this shaft 89 rotates a worm wheel nut 91 around a thread 92 above a slide 93 from which protrudes a pin 94 carrying the far extension wheel 7. Upon the shaft 89 is a bevel wheel 95 engaging a bevel wheel 96 on a cross shaft 97. Upon the shaft 97 is a bevel wheel 98 engaging a bevel wheel 99 on a longitudinal shaft 100. A worm 101 on the shaft 100 engages a worm wheel nut 102 turning it around a thread 92 above a slide 93 as before described. When elevating or depressing the extension wheels 7, the wheels 49 and 50, 61 and 62 are disengaged.

To elevate or depress the traversing wheel 9 (Figs. 1, 2, 8 and 9) a bevel wheel 103 is situated on the shaft 48. This wheel 103 by a bevel wheel 104 drives a longitudinal shaft 105. These wheels 103 and 104 are engaged or disengaged in any ordinary way. Upon the shaft 105 is a spiral pinion 106 driving a spiral pinion 107 on a cross shaft 108. A worm 109 on this shaft 108 turns a worm wheel nut 110 around a thread 111 above a slide 112. Upon a pin 113 outstanding from the slide 112 turns the traversing wheel 9. When elevating or depressing the traversing wheel 9, the wheels 49 and 50, 61 and 62, 84 and 85 are disengaged so as not to affect wheels 8 and 9.

To elevate or depress the traversing wheels 8 (Figs. 1, 2 and 8) a spiral pinion 114 is situated upon the shaft 48. This spiral pinion 114 turns a spiral pinion 115 upon one end of a divided longitudinal shaft 116, interposed in which is a suitable clutch 318. Upon the other end of the shaft 116 is a spiral pinion 117 turning a spiral pinion 118 upon a cross shaft 119, at or near each end of which is a toothed wheel 120. Each wheel 120 turns a toothed wheel 121, each of which latter is secured to a cross shaft 122. Upon each shaft 122 is a worm 123, driving a worm wheel nut 124 around a thread 125 above a slide 126 (Fig. 1.) From each slide protrudes a pin 127 carrying the traversing wheel 8.

To elevate or depress the turntable (Figs. 1, 2, 8 and 10) a bevel wheel 128 is situated upon the shaft 116. This wheel 128 by a bevel wheel 129 rotates a vertical shaft 130 on which is a bevel wheel 131. The wheels 128 and 129 are engaged or disengaged in any ordinary way. The bevel wheel 131 rotates a bevel wheel 132 on a cross shaft 133 upon which are two sprocket wheels 134 and 135. The wheel 134 drives by a sprocket chain 136 a sprocket wheel 137 on a cross shaft 138. On the shaft 138 is a worm 139 turning a worm wheel nut 140, through which passes a depressing screw 141. The screw 141 presses against a top plate 142 of the turntable and forces it and a bottom plate 143 downwardly. The wheel 135 by a sprocket chain 144 rotates a sprocket wheel 145 upon a shaft 146 having two worms 139 thereon. Each worm rotates a worm wheel nut 140 around a depressing screw 141 connected to the turntable as before described. When elevating or depressing the turntable, the bevel wheels upon the shaft 48 are disengaged so as not to affect the wheels 7 and 9.

When it is necessary to grind rails a grinder adapter is pivoted to the trunnions 10. This adapter (Figs. 11, 12, 13 and 14) includes a framework 147 supported on its far side by a flanged wheel 148, which turns upon a pin 149 outstanding from a slide 150. Above the slide 150 is a thread 151 around which is a worm wheel nut 152 turned by a worm 153 upon a cross shaft 154. The shaft 154 is operated by a hand wheel 155. By vertical adjustment of the wheel 148 the grinding wheels attain the same lateral plane as the rail beneath them, as will be hereinafter understood. In bearings upon the framework are trunnion holes to accommodate the trunnions 10, which holes are covered by removable trunnion caps 156. The near side of the framework is supported on a multiplicity of rollers 157 having axles 158 turning within a carrier 159. In the carrier, which consists of an inner portion united to an outer portion, is a hole accommodating the outer end of a pin 160, the inner end 161 of which is secured to the framework. To outer lugs 162 of the carrier are secured angularly inclined pins 163 around which turn outer beveled rollers 164 designed to clear upstanding fish plates. To inner lugs 165 are secured pins 166 around which turn inner rollers 167. In the outer end of the pin 160 is a threaded hole to receive the inner end of a screw 168 having at its outer end a hand wheel 169. The screw by collars 170 is collared to a bridge 171 attached to the carrier 159. The hand wheel laterally adjusts the grinding wheels, but slight adjustment being necessary.

At the near side of the framework 147 are the grinding wheels 172 and 173, each stopped or started by a hand wheel 174 secured to a cross shaft 175. On each shaft 175 is a bevel wheel 176 turning a bevel wheel 177 upon an inclined shaft 178. Upon each shaft 178 is a spiral pinion 179 turning a spiral pinion 180 on a cross shaft 181. Upon each shaft 181 are two pinions 182 each turning a toothed wheel 183. The toothed wheels 183 are concentrically secured to horizontal cylindrical bearings 184, each having an eccentric hole therein to accommodate a cross shaft 185. In each bearing 184 is also an elongated recess or recesses. Each recess accommodates the point of a screw or like limit stop 186 protruding downwardly from the framework. To each shaft 185 is concentrically secured (see also Fig. 3) a friction pinion 187 and also one end of a suitable universal coupling 188. To the other end of each universal coupling 188 is secured a grinding wheel shaft 189. Each shaft 189 turns within a bearing 190.

Each grinding wheel is lifted or lowered by a hand wheel 191 rotating a cross shaft 192. Each shaft 192 turns a worm 193 rotating a worm wheel nut 194. Each nut 194 rests upon a collar 195 having a trunnion 196 at each side resting in bearings on the framework. Each worm wheel nut 194 turns around a screw 197 at the bottom of which is a pivot 198 passing through lugs 199 above the outer end of its bearing 190. From the inner end of each bearing 190 extend links 200 pivoted to a pin 201 in lugs 202 protruding from the framework.

The grinding wheels are driven (see also Figs. 1, 2 and 3) by the motor shaft 11 driving a suitable change gear 203, which in turn drives a suitable change gear 204 situated upon a longitudinal shaft 205. To the shaft 205 is secured by a suitable coupling 206 a longitudinal grinder adapter shaft 207. Upon the shaft 207 is a bevel wheel 208, driving a bevel wheel 209 on a cross shaft 210. Upon the shaft 210 is a toothed wheel 211 driving a toothed pinion 212 on a cross shaft 213. These toothed wheels are interchangeable with reserve wheels carried by the machine, so that a uniform peripheral speed may always be maintained for the grinding wheels. Upon the shaft 213 is situated a friction wheel 214 engaging with the friction pinions 187 on the shafts 186. The machine is propelled when grinding as hereinbefore described.

Secured to the framework 147 is a grinding wheel guard 215 having a hole through its crown above each grinding wheel to admit a dresser 216. This turns upon a pin 217 secured to a slide 218 moving vertically between the legs 219 of a bow. The lower ends of the legs are secured to the guard, and through the bow passes a collared nut 220 turned by the hand wheel 221. In the nut is a screw 222 attached to the slide 218. When a grinding wheel requires dressing, the hand wheel 221 above it is turned, thereby depressing the dresser 216 upon the grinding wheel as the latter is rotating.

When it is necessary to remove burs or bevels of plain headed rails or reseat fish plates of either class of rails, a vertical cutter adapter is pivoted to the trunnions 10. This adapter (Figs. 15, 16 and 17) includes a framework 223, beneath which are flanged wheels 224, each turning upon a pin 225 outstanding from a slide 226. Above the slide is a thread 227 around which turns a worm wheel nut 228 by a worm 229. Interposed between the framework and the slide 226 may be a removable adjusting piece 230 to regulate the width of the wheels 224 to any gage of rails. Each worm 229 is turned by a hand wheel 231. In bearings upon the framework are holes to accommodate the trunnions 10 above which holes are trunnion caps 232. Secured to the said framework is an upper cross bar 233 and a lower cross bar 234, the ends of both of which extend beyond the framework.

Upon the outstanding ends of the cross bars 233 and 234, and at each side of the adapter, is placed a laterally moving bracket 235, having separated flanges 236 tightened by bolts 237. Adjacent to each bracket is a hand wheel 238 turning a screw 239. Each screw turns within a nut 240 in the framework, and by means of a collar 241 the said bracket is moved laterally. United to the shaft 205 by the coupling 206 is (see also Fig. 5) a cutter adapter shaft 242, upon which is a bevel wheel 243 driving one of two bevel wheels 244 upon a cross shaft 245. The bevel wheels 244 are engaged or disengaged with the wheels 243, and retained in engagement in any ordinary way, each rotating the shaft 245 in a different direction. Upon each end of the shaft 245 is a toothed pinion 246 engaging with a wheel 247. Each wheel 247 is keyed to a cross shaft 248 capable of moving longitudinally through it. Each shaft 248 is supported by a bearing extension 249 protruding from each bracket 235. Secured to each shaft 248 is a bevel pinion 250 rotating a beveled wheel 251. Each bevel wheel 251 drives a vertical spindle 252, at the top of which is a thread 253. Around each thread turns a toothed wheel nut 254 rotated by a toothed pinion 255. Each pinion 255 is turned by a vertical shaft 256, having at its bottom a hand wheel 257. At the bottom of the spindle is a cutter 258.

Secured beneath each bracket 235, and capable of lateral movement, is an alining and steadying attachment 259, depending from which is an inner roller 260. Upon a pivot 261 turns a bell crank lever having a long spring arm 262 and a short arm 263. Through the outer end of the arm 262 passes an adjusting screw 264. Around a pin below the short arm turns an outer roller 265. The rail head is accommodated between the inner and outer rollers. The machine is propelled when cutting as hereinbefore described.

When grooved rails require their grooves deepening or their lip tops removed, a horizontal cutter adapter is pivoted to the trunnions 10. This adapter (Figs. 18, 19 and 20) consists of a frame work 266 resting upon flanged wheels 267. The flanges may rest upon the groove bottoms or the wheels may run upon the rail treads, dependent upon circumstances. Each wheel 267 turns upon a pin 268 outstanding from a slide 269, above which is a thread 270. A worm wheel nut 271 is rotated around the thread by a worm 272 on a cross shaft 273 rotated by a hand wheel 274. In bearings upon the framework are trunnion holes covered by trunnion caps 275.

In suitable bearings and turned as hereinafter described are cutter shafts 276. On the outer end of each cutter shaft is a cutter 277 (see also Fig. 7.) Adjoining each cutter and outstanding from the framework are studs 278, at the outer end of which is a nut 279. An externally threaded sleeve 280 loose upon each stud, has attached to its outer end a hand wheel 281. Between the inner end of each sleeve and a stop 282 is situated a spiral spring 283. Across the studs and threaded to the sleeves 280 is a cross piece 284, to the center of which the shaft 276 is connected.

The shaft 205 by the coupling 206 is secured to a horizontal cutter adapter shaft 285 upon which (see also Fig. 6) is a toothed wheel 286 rotating toothed wheels 287. Each wheel 287 turns a longitudinal shaft 288 upon which is a worm 289 turning a worm wheel 290 upon a cross shaft 291. Upon each shaft 291 is a toothed barrel 292 rotating a toothed barrel 293 upon each cutter shaft 276. The machine is propelled, when cutting, as hereinbefore described.

At each side of the machine (Fig. 1) is a hand lever 294 attached to a cross shaft 295 to which is also attached a subsidiary lever 296. To a pivot on the subsidiary lever is pivoted a connecting rod 297 pivoted by a pivot 298 to the upper end of a bell crank lever 299. The bell crank lever is pivoted to a pivot 300 outstanding from the platform. A pivot pin 301 on the lever 299 is pivoted to a turn buckle 302 having at the bottom a pivot 303. To this pivot is pivoted a bell crank lever 304. Outstanding from the platform are two pivots 305. To each pivot is pivoted a dropper 306. At the bottom of each dropper is a pivot 307. The bell crank lever 304 is pivoted to the pivot 307 in the dropper adjacent to it. To a pivot 308 in the lever 304 is pivoted a connecting rod 309, to the other end of which is pivoted the pivot 307 at the bottom of the other dropper. In each dropper is a pivot 310 pivoting a block 311.

This invention is operated as follows: When it is desired to attach an adapter, the particular adapter shaft is placed in the trunnions 10 and connected with the shaft 205 by the coupling 206. The front ends of the extensions 4 are elevated by depressing the extension wheels 7. The trunnion caps of the adapter are removed and the adapter moved laterally into position. The wheels 7 are then elevated and the trunnions 10 sink into the adapter's trunnion holes, after which the trunnion caps are positioned. When a grinder adapter (Figs. 11-14) is attached, the bevel wheel 208 upon that adapter shaft engages with the bevel wheel 209, and grinding of the rails can be commenced after the auxiliary wheels 6 have been depressed to bear on the rails, and mitigate, with the main driving wheels 5, the effect of any rail joint depressions. The platform, therefore, rests when grinding on the driving wheels 5, auxiliary wheels 6, the wheel 148 of the adapter on the one side, and on the multiple rollers 157 on the other. Should grinding wheels be provided at each side of the adapter, however, the wheel 148 would be deposed by multiple rollers. The machine, when grinding, is moved forward by the main driving wheels and auxiliary wheels as described.

When a vertical cutter adapter (Figs. 15-17) is to be used, that particular adapter shaft is first placed in the trunnions and coupled to the shaft 205. When the adapter is positioned on the trunnions, the bevel wheel 243 engages with one of the bevel wheels 244. The particular cutters desired are attached to the vertical spindles 252. When a horizontal cutter adapter (Figs. 18-20) is to be used its particular adapter shaft is first placed through the trunnions 10 and coupled to the shaft 205, the adapter being attached to the trunnions in the same way as the other adapters. If necessary, tie bars may be attached to any of the adapters and pivotally connected to the platform. Instead, however, of moving the adapters to the extensions 4 the traversing wheels may be depressed on to temporarily laid cross rails and the machine run out to either side of the track over the adapter to be lifted. It may then pick it up and return to the track.

We do not herein claim the particular construction of the grinder adapter (Figs. 11-14), or of the vertical cutter adapter (Figs. 15-17), or of the horizontal cutter adapter (Figs. 18-20), as the same form the subject-matter of three separate divisional applications filed by us February 4, 1911; on machines for dressing rails, and respectively serially numbered, 606,498; 606,499; 606,500.

Having now described our invention what we claim as new and desire to secure by Letters Patent is:—

1. In improvements in moving machines for dressing rails, a platform, driving wheels below said platform, extensions from said platform, an adapter, and means below said extensions to pivotally attach said adapter thereto about a central longitudinal axis thereof.

2. In improvements in moving machines for dressing rails, a platform, means for propelling said platform, an adapter centrally pivoted to said platform about a longitudinal axis thereof, adjustable rail dressing means carried by said adapter, and means for operating said rail dressing means from the platform propelling means.

3. In improvements in moving machines for dressing rails, a platform, hollow trunnions to said platform, an adapter shaft bearinged by said hollow trunnions, an adapter pivoted to said hollow trunnions, and adjustable rail dressing means carried by said adapter and driven by said adapter shaft.

4. In improvements in moving machines for dressing rails, a platform, driving wheels below said platform, extensions from said platform, hollow trunnions below said extensions, wheels below said extensions, and means for elevating and depressing said extension wheels.

5. In improvements in moving machines for dressing rails, a platform, non-depressible driving wheels below said platform, auxiliary wheels below said platform, means for elevating or depressing said auxiliary wheels, extensions from said platform, hollow trunnions below said extensions, wheels below the front ends of said extensions, and means for elevating and depressing said wheels.

6. In improvements in moving machines for dressing rails, non-depressible driving wheels, a platform above said driving wheels, extensions from said platform, depressible wheels below the front ends of said extensions, an adapter pivoted about a central longitudinal axis of said platform and situated between the depressible extension wheels and the driving wheels.

7. In improvements in moving machines for dressing rails, a platform, a motor above said platform, traversing wheels below said platform, means for driving said traversing wheels from said motor, means for elevating and depressing said traversing wheels from said motor.

8. In improvements in moving machines for dressing rails, a platform, a motor above said platform, a turntable below said platform, means for elevating and depressing the turntable, in relation to the platform, from said motor.

9. In improvements in moving machines for dressing rails, a platform, a motor above said platform, driving wheels below said platform, means for driving said wheels from said motor, means for braking said wheels, extensions from said platform, wheels below said extensions, means for elevating and depressing said extension wheels from said motor, traversing wheels below said platform, means for driving said traversing wheels from said motor, means for elevating and depressing said traversing wheels from said motor, a turntable below said platform, and means for elevating and depressing said turntable from said motor.

10. In improvements in moving machines for dressing rails, a platform, a motor above said platform, driving wheels below said platform, traversing wheels below said platform, means for elevating and depressing said traversing wheels from said motor, a turntable below said platform, means for elevating and depressing said turntable from said motor, extensions from said platform, extension wheels below said extensions, means for elevating and depressing said extension wheels from said motor, hollow trunnions below said extension, an adapter shaft bearinged by said trunnions, an adapter pivoted to said hollow trunnions about a central longitudinal axis of the platform, and rail dressing means carried by said adapter.

11. In a machine for dressing rails while in position on the track, a platform, means for supporting said platform upon the rails, an adapter supported upon the rails and removably pivoted to said platform about a central longitudinal axis thereof, and dressing means carried by said adapter.

In testimony whereof we affix our signatures in the presence of two subscribing witnesses.

MICHAEL WOODS.
THOMAS JEFFERSON GILBERT.

Witnesses:
 CECIL W. LE PLASTRIER,
 GEORGE A. U'REN.

---

Copies of this patent may be obtained for five cents each, by addressing the "Commissioner of Patents, Washington, D. C."